United States Patent
Lee

(10) Patent No.: US 8,745,527 B2
(45) Date of Patent: Jun. 3, 2014

(54) TERMINAL AND METHOD OF CONTROLLING WINDOWS THEREOF

(75) Inventor: Seung Jun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 851 days.

(21) Appl. No.: 11/931,679

(22) Filed: Oct. 31, 2007

(65) Prior Publication Data

US 2008/0235619 A1  Sep. 25, 2008

(30) Foreign Application Priority Data

Mar. 19, 2007 (KR) .................. 10-2007-0026609

(51) Int. Cl.
*G06F 3/048* (2013.01)
(52) U.S. Cl.
USPC .......................... 715/804; 709/219
(58) Field of Classification Search
USPC .......................... 715/804; 709/219
See application file for complete search history.

(56) References Cited

U.S. PATENT DOCUMENTS

| | | | | |
|---|---|---|---|---|
| 4,975,690 A * | 12/1990 | Torres | ............... | 715/856 |
| 6,072,486 A * | 6/2000 | Sheldon et al. | ............... | 715/835 |
| 6,278,450 B1 * | 8/2001 | Arcuri et al. | ............... | 715/763 |
| 6,751,630 B1 * | 6/2004 | Franks et al. | ............... | 1/1 |
| 7,614,008 B2 * | 11/2009 | Ording | ............... | 715/773 |
| 7,703,039 B2 * | 4/2010 | Agarwal | ............... | 715/788 |
| 2003/0110924 A1 * | 6/2003 | Miyamoto | ............... | 84/477 R |
| 2003/0227488 A1 * | 12/2003 | Arend et al. | ............... | 345/795 |
| 2004/0158746 A1 * | 8/2004 | Hu et al. | ............... | 713/202 |
| 2005/0223334 A1 * | 10/2005 | Guido et al. | ............... | 715/794 |
| 2006/0010433 A1 | 1/2006 | Neil | | |
| 2007/0028182 A1 | 2/2007 | Kong | | |
| 2007/0088680 A1 * | 4/2007 | Sauve et al. | ............... | 707/3 |
| 2007/0182973 A1 * | 8/2007 | Godley | ............... | 358/1.6 |

FOREIGN PATENT DOCUMENTS

| | | |
|---|---|---|
| CN | 1334533 A | 2/2002 |
| CN | 1755630 A | 4/2006 |
| CN | 1870478 A | 11/2006 |
| CN | 1924814 A | 3/2007 |

OTHER PUBLICATIONS

Attached Document—http://www.technologyquestions.com/technology/windows-xp/25858-window-automatically-minimizes-30-seconds.html Publication Date: Jan. 4, 2007.*

* cited by examiner

*Primary Examiner* — Steven B Theriault
*Assistant Examiner* — Peiyong Weng
(74) *Attorney, Agent, or Firm* — Birch, Stewart, Kolasch & Birch, LLP

(57) ABSTRACT

A method of controlling windows in a terminal. The method includes displaying at least first and second windows on the terminal, inputting a command via the first window, and applying the input command to both of the first and second windows.

16 Claims, 19 Drawing Sheets

TERMINAL AND METHOD OF CONTROLLING WINDOWS THEREOF

This application claims priority to Korean Patent Application No. 10-2007-0026609, filed in Korea on Mar. 19, 2007, which is hereby incorporated by reference as if fully set forth herein.

BACKGROUND OF THE INVENTION

1. Field of the Invention

The present invention relates to a terminal and corresponding method that simultaneously applies an input command to multiple windows.

2. Discussion of the Related Art

Terminals such as personal computers, laptops and other computing devices now include window software that allows a user to display a plurality of windows and perform different task in each window. Mobile terminals such as cell phones also now provide similar features. Therefore, a user can perform multiple tasks on a same terminal.

For instance, when the terminal is connected to the Internet, the user can activate two or more applications such as a YAHOO application in one window and a "GOOGLE" application in another window. The user can then review their emails on the YAHOO application window and search for information in the GOOGLE application window.

However, there is no connection between the multiple displayed windows. Therefore, the user has to operate each application window separately

SUMMARY OF THE INVENTION

Accordingly, one object of the present invention is to address the above-noted and other problems.

Another object of the present invention is to provide a terminal and corresponding method that applies an input command to multiple windows.

To achieve these objects and other advantages and in accordance with the purpose of the invention, as embodied and broadly described herein, the present invention provides in one aspect a method of controlling windows in a terminal. The method includes displaying at least first and second windows on the terminal, inputting a command via the first window, and applying the input command to both of the first and second windows.

In another aspect, the present invention provides a method of controlling windows in a terminal. The method includes displaying at least first and second windows, displaying a universal toolbar for operating the first and second windows, inputting a command via the universal toolbar, and applying the input command to both of the first and second windows.

In still another aspect, the present invention provides a method of controlling windows in a terminal. The method includes displaying at least first and second windows each having a selection box, inputting a command via a universal command region, and selectively applying the input command to any of the first and second windows that has the selection box selected.

In another aspect, the preset invention provides a terminal including a display unit configured to display at least first and second windows on the terminal, an input unit configured to input a command via the first window, and a control unit configured to apply the input command to both of the first and second windows.

In yet another aspect, the present invention provides a terminal including a display unit configured to display at least first and second windows, and to display a universal toolbar for operating the first and second windows, an input unit configured to input a command via the universal toolbar, and a control unit configured to apply the input command to both of the first and second windows.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
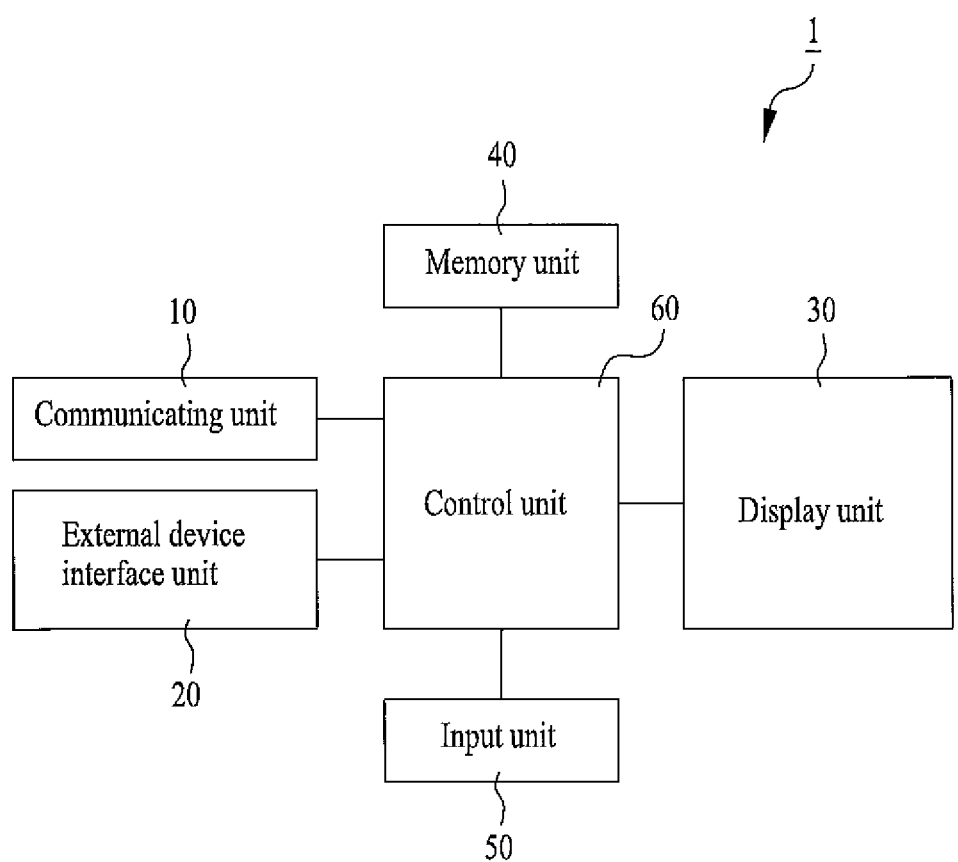
FIG. 1 is a block diagram of a terminal according to an embodiment of the present invention.

FIG. 1 is a block diagram of a terminal 1 according to an embodiment of the present invention. The terminal in the present invention is any type of terminal capable of executing an operation on the terminal via a window. For example, the terminal can be a personal computer or laptop computer using the WINDOWS operational system by Microsoft Corporation. The terminal may also be a mobile terminal such as a PDA, a mobile phone, a game player, and the like.

The following description refers to the terminal being a mobile terminal, but the invention applies to the other types of terminals as well. As shown in FIG. 1, the terminal 1 includes a communicating unit 10, an external device interface unit 20, a display unit 30, a memory unit 40 and a control unit 60. The terminal 1 also includes other various additional elements (e.g., a battery unit) that are not shown in the FIG. 1.

In addition, the communicating unit 10 enables the terminal 1 to carry out Internet communications with an external environment, and enables the terminal user to have voice communications with another party. Further, the external device interface unit 20 allows the user to connect an external device to the terminal 1. For example, the external device interface unit 20 may be a USB (Universal Serial Bus) interface allowing a user to connect a USE memory to the terminal 1.

Further, when an Internet website ID and password are stored in the USE memory, and when the USB memory is connected to the terminal 1, the control unit 60 automatically recognizes the USB memory has been connected to the terminal 1. The control unit 60 also recognizes that the information stored in the USB memory is an Internet website ID and password, and automatically connects to the website using the ID and password.

In addition, the display unit 30 displays various types of information relating to currently executing functions. In particular, the display unit 30 displays at least two windows under the control of the control unit 60. The display unit 30 also displays a universal toolbar for the at least two windows. Further, the display unit 30 may include a touch screen that the user can touch to select or input information into the terminal 1.

In addition, the memory unit 40 stores various types of software, firmware, and/or data used for operating the terminal 1. For example, the memory unit 40 may store an Internet website ID and password. The control unit 60 may then use this information to connect to the website corresponding to the Internet website ID.

Further, the input unit 50 allows a user to input various types of information or commands into the terminal 1. Also, when the display unit 30 is a touch screen, the input unit 50 can be omitted to simplify the configuration of the terminal 1.

In addition, the control unit 60 controls the communicating unit 10, the external device interface unit 20, the display unit 30, the memory unit 40, and the input unit 50 to thereby control an overall operation of the terminal 1.

In the below described embodiments, it is assumed the mobile terminal is executing Internet browser windows. However, the present invention is also applicable to other type of windows such as a document editor window (e.g., MS WORD).

First Embodiment

A method of controlling windows according to a first embodiment of the present invention will now be explained with reference to FIGS. 2 and 3. FIG. 1 will also be referred to in this description.

Figure 2:
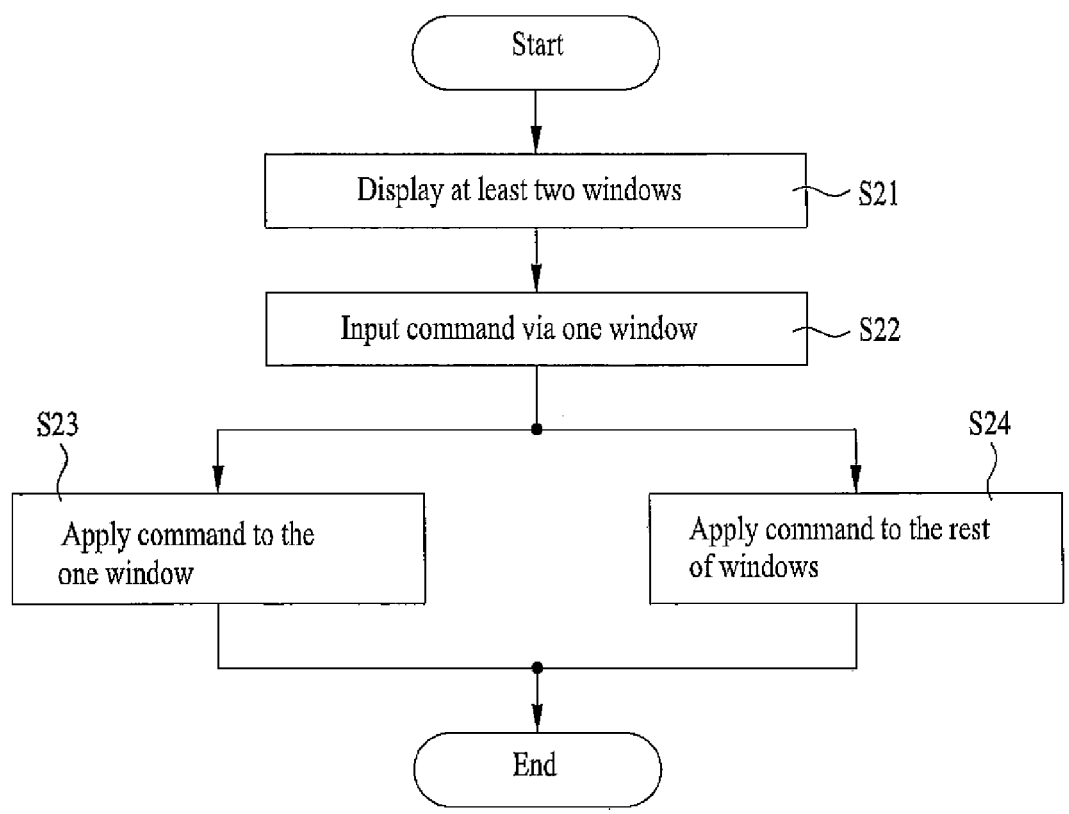
FIG. 2 is a flowchart of a method of controlling windows according to a first embodiment of the present invention.

As shown in FIG. 2, the method includes displaying at least two Internet browser windows on a screen of the display unit 30 (S21). Note that FIG. 3 illustrates three windows 100A, 100B and 100C being activated and displayed and another window 100D being displayed as a minimized window.

Figure 3:
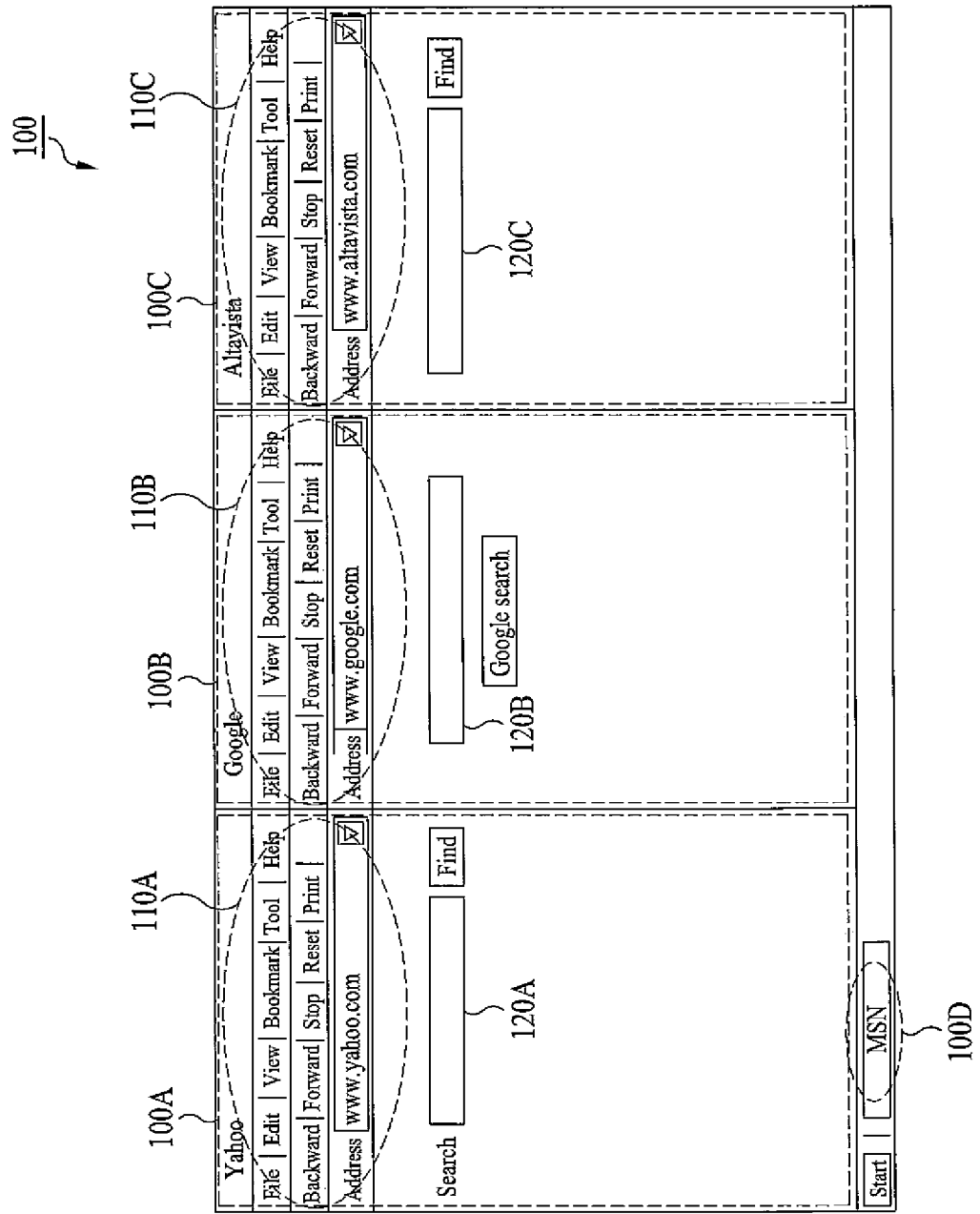
FIG. 3 is an overview of a screen of a terminal display unit used to implement the window controlling method according to the first embodiment of the present invention.

In FIG. 3, the three windows 100A, 100B and 100C include individual toolbars 110A, 110B and 110C, respectively. The three windows 100A, 100B and 100C are preferably configured to interoperate with each other.

In particular, and as shown in FIG. 2, when a command is input to one of the display windows (S22), the input command is input to the one display window (S23) and also to the other displayed windows (S24). For instance, when the user inputs a 'reset' command into the window 100A, the 'reset' command is also automatically applied to the windows 100B and 100C. In addition, the 'reset' command is preferably applied to all of the three windows simultaneously. Thus, in this example, each window would be reset or reloaded.

Further, it is also possible that the 'reset' command is applied to the minimized window 100D. The user can decide whether the command is going to be input to minimized as well as the other displayed windows by selecting the appropriate menu options provided on the terminal 1 according to the present invention.

In addition, other types of commands include a 'search' command, a 'log-in' command, a 'print' command, etc. Thus, the user can enter a plurality of different commands into one window, and have that command executed in the other displayed windows.

For example, and with reference to FIG. 3, when the user enters a certain keyword in the keyword input box 120A of the window 100A, the entered keyword is also applied to the other windows 100B and 100C. Therefore, in FIG. 3, the user can simultaneously search for a particular keyword using the YAHOO search program in the window 100A, the GOOGLE search program in the window 100B, and the ALTAVISTA search program in the window 100C A similar concept applies to the 'print' and 'reset' commands. That is, the user can select the 'print' or 'reset' menu options shown in the toolbar 110A of the first window 100A, and have that command also executed in the other windows 100B and 100C. Further, for the 'print' command, the content of each window can be printed on separate pages, or the contents of each window can be printed on one page.

The user can also set the printing characteristics by using the appropriate menu option provided on the terminal according to the present invention. For example, when the user selects a 'print' command in one of the toolbars, a menu option may be displayed asking the user if he or she wants to print the contents of all displayed windows on a single page or on separate pages.

Second Embodiment

The second embodiment is similar to the first embodiment, except that the user designates which windows are to simultaneously receive an input command. That is, the user may want to selectively apply the input command to only some of the display windows instead of applying the input command to all of the windows.

Figure 4:
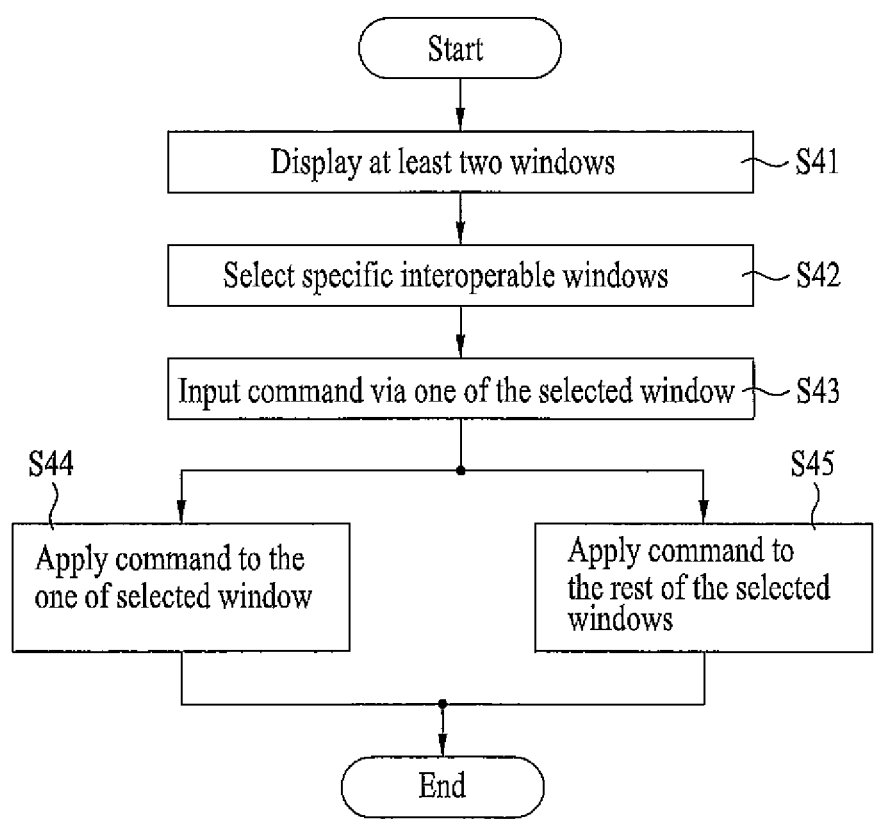
FIG. 4 is a flowchart of a method of controlling windows according to a second embodiment of the present invention.
Figure 5:
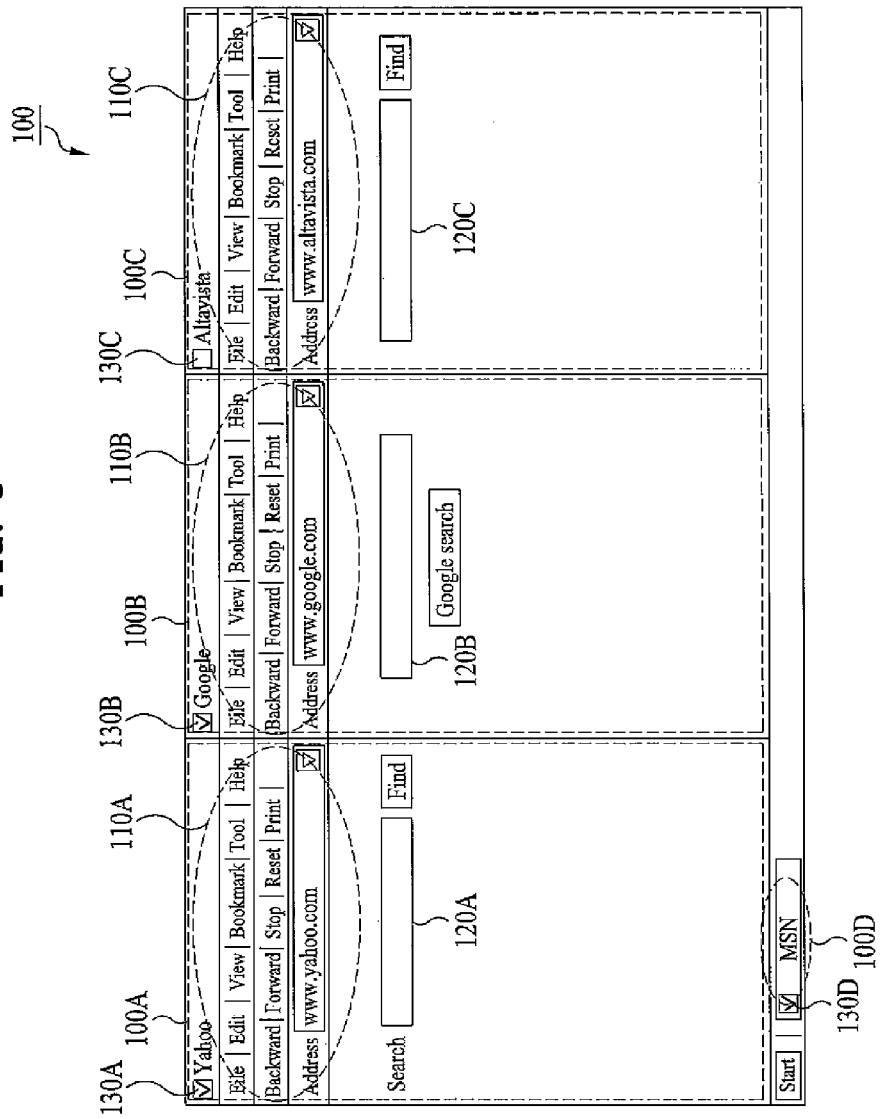
FIG. 5 is an overview of a screen of a terminal display unit used to implement the window controlling method according to the second embodiment of the present invention.

FIGS. 4 and 5 illustrate features of the second embodiment. FIG. 1 will also be referred to in this description. As shown in FIG. 4, the control unit 60 displays at least two windows (S41) on the display unit 30 based on instructions input by the user. FIG. 5 illustrates the four windows 100A, 100B, 100C and 100D being displayed (similar to FIG. 3). However, as shown in FIG. 5, the four windows 100A, 100B, 100C and 100D include selection boxes 130A, 130B, 130C, and 130D, respectively, that the user can select to designate windows that are to be operated together (i.e., that a command input into one window is also input into the other selected windows).

Therefore, as shown in FIG. 4, the user selects the windows that he or she wants to interoperate with each other by selecting the appropriate selection boxes (S42). The following description assumes the user has selected the selection boxes of the three windows 100A, 100B and 100D.

Then, when the user enters a command into the window 101A (S43), the command is applied to the window 100A (S44) and also to the windows 100B and 100D that the user has selected (S45). Therefore, the user can selectively decide which windows are to be operated together such that the user can enter any of the commands 'reset', 'search', 'log-in', 'print', etc. into one window and have the command automatically executed in the other designated windows.

Third Embodiment

Figure 6:
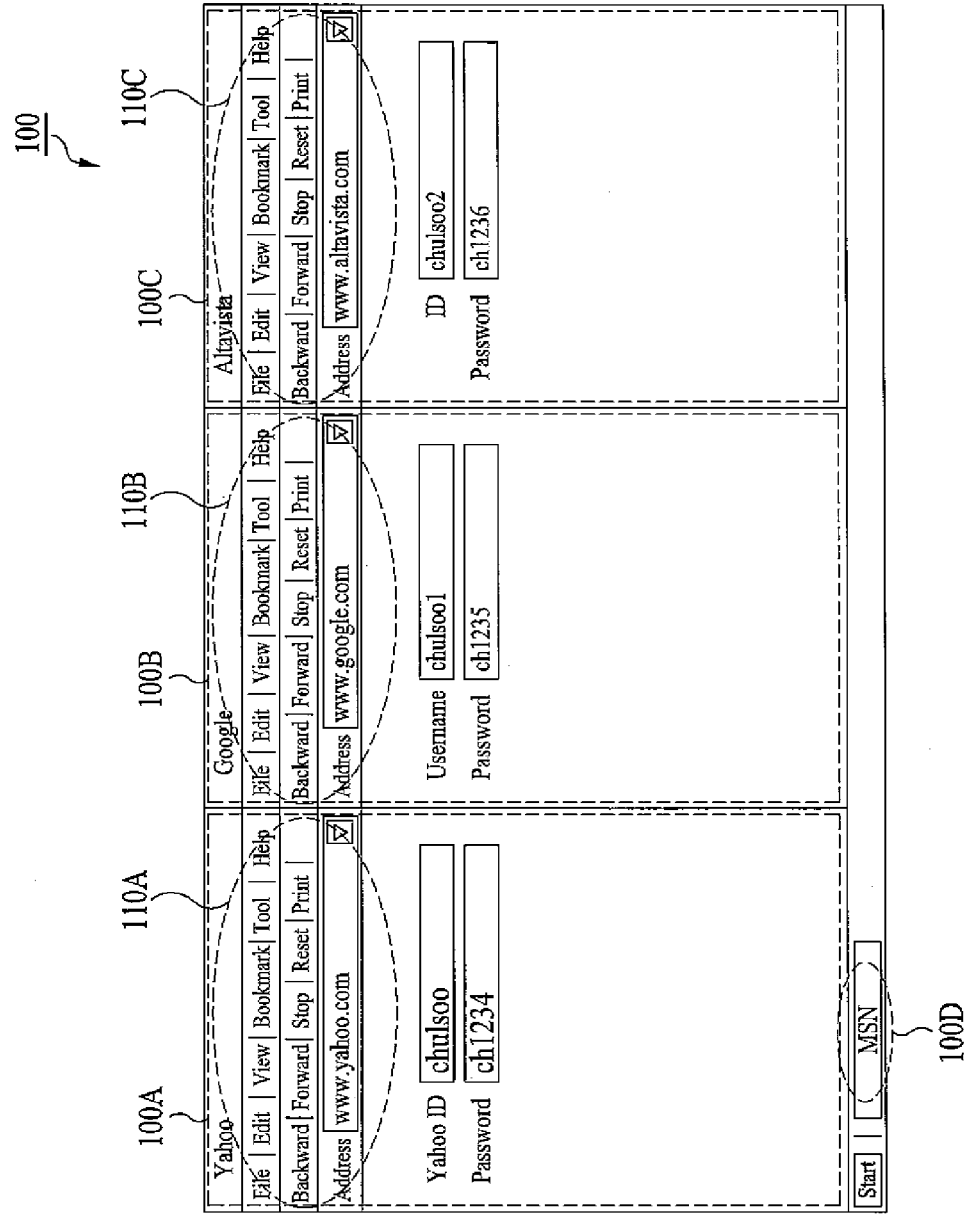
FIGS. 6 and 7 are overviews of a screen of a terminal display unit used to implement a window controlling method according to a third embodiment of the present invention.
Figure 7:
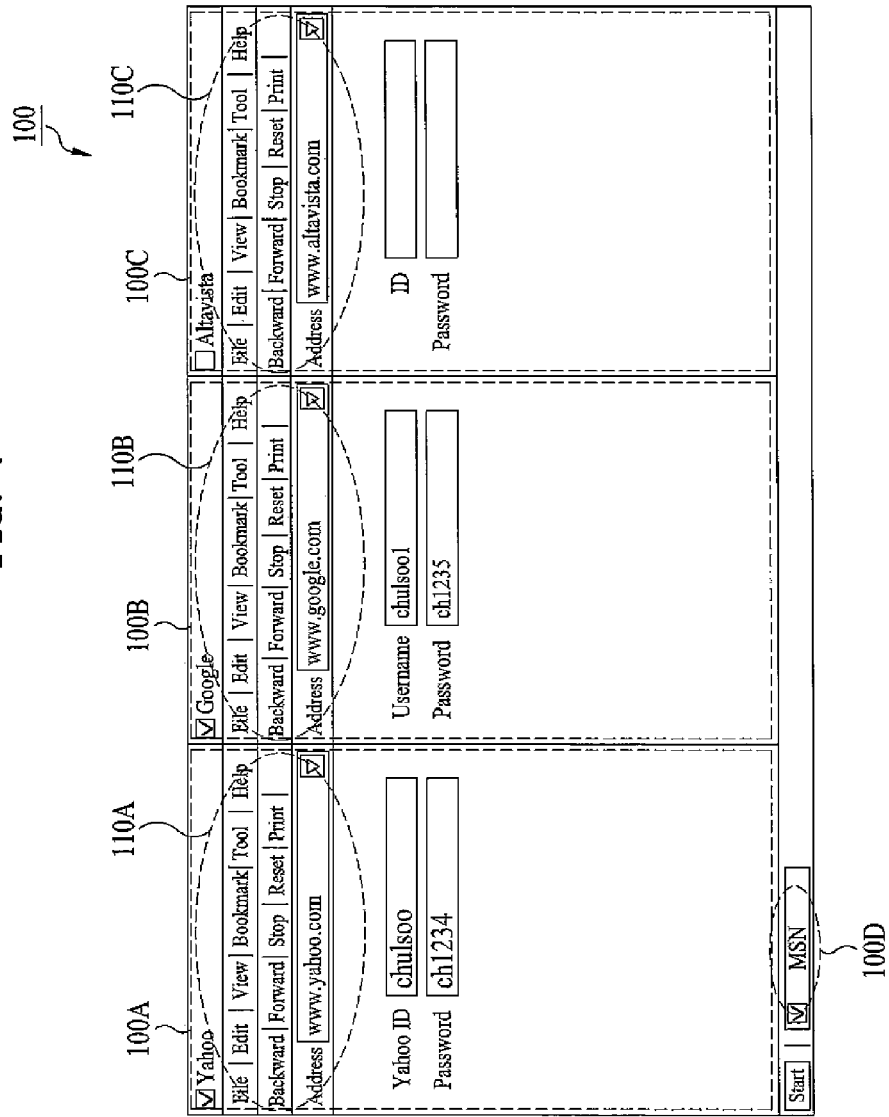

The third embodiment of the present invention relates to the 'log-in' command being applied to multiple windows. FIGS. 6 and 7 include features related to the third embodiment. FIG. 1 will also be referred to in this description.

First, the below table includes a terminal user's ID and password for each Internet site, and this information is stored in the memory unit 40 of the terminal 1.

TABLE 1

| Internet Site | ID | Password |
| --- | --- | --- |
| Yahoo | chulsoo | ch1234 |
| Google | chulsoo1 | ch1235 |
| Altavista | chulsoo2 | ch1236 |
| MSN | Kimchulsoo | kim1234 |

In addition, the IDs and passwords for the Internet sites in Table 1 may be equal to or different from each other. As shown in FIG. 6, the three windows 100A, 100B and 100C are activated and displayed and the window 100D is displayed as being minimized (similar to the other embodiments).

Further, in this embodiment, when the user enters or inputs an ID and password to the window 100A (i.e., the YAHOO website), the control unit 60 compares the input ID and password with the information stored in Table 1 to determine if the input ID and password matches with the information in the table for that particular website.

If the input ID and password are correct, the control unit 60 reads the ID and password for the other websites and inputs the read ID and password into each corresponding website. Thus, the user can enter multiple websites by only entering a single log in command.

In addition, if the table does not have an ID and password for a particular website, the control unit 60 can display a warning message to the user via the display unit 30 or can automatically enter the input ID and password into the window that does not have the ID and password in the table.

Hence, when the user inputs a correct ID and password into one of the multiple windows, the other appropriate ID and password can be automatically input to the rest of the windows to enhance the user's convenience and facilitation.

FIG. 7 is similar to FIG. 6, but includes the selection boxes 130A, 130B, 130C and 130D (similar to FIG. 5). Thus, the user can selectively determine what windows are to simultaneously receive the input command.

Further, the information in table 1 may be stored in an external memory (e.g., a USB memory), rather than being stored in the memory unit 40. In this instance, when the external memory is loaded in the external interface unit 20,
the control unit 60 can read the information stored in the external memory and apply the stored information (e.g., login information for particular websites) automatically to the multiple windows that are configured to operate with each other. Thus, the user does not need to input the command into any window, but rather this information is automatically input to the correct windows by the control unit 60.

Fourth Embodiment

Figure 8:
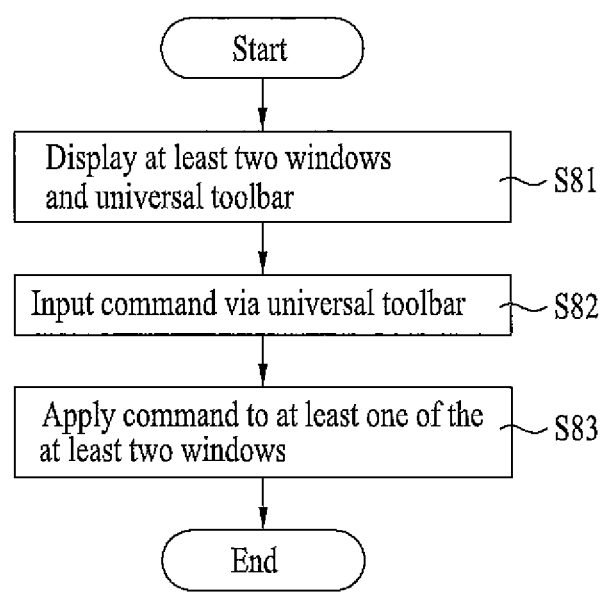
FIG. 8 is a flowchart of a method of controlling windows according to a fourth embodiment of the present invention.
Figure 9:
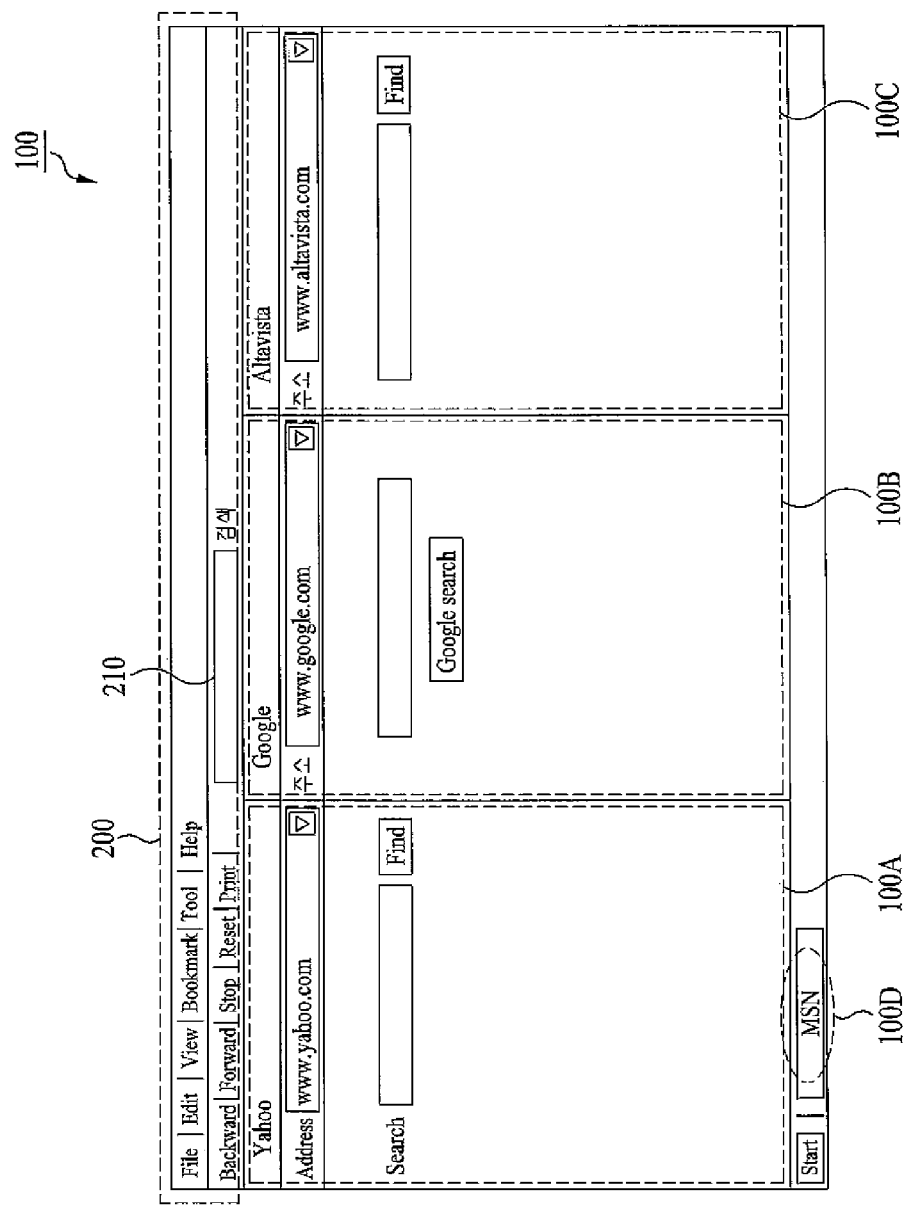
FIGS. 9 and 10 are overviews of a screen of a terminal display unit used to implement a window controlling method according to the fourth embodiment of the present invention.
Figure 10:
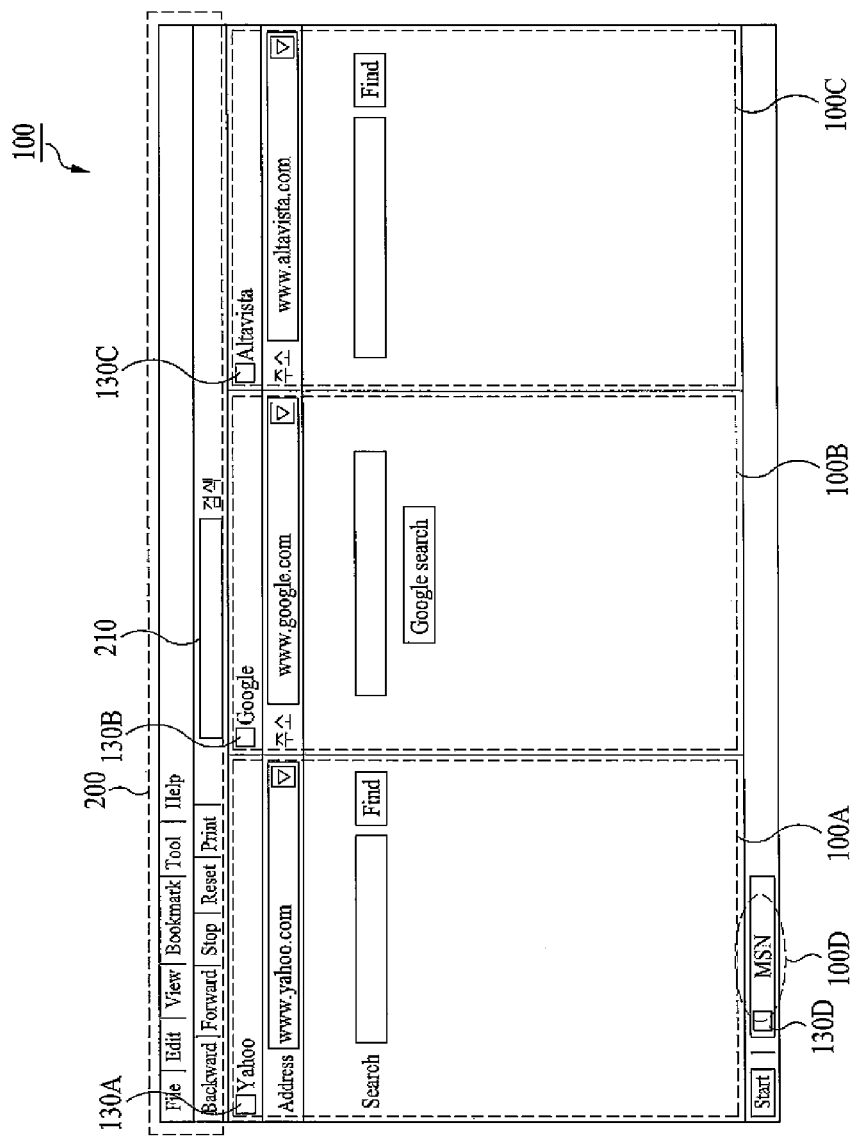

In the first to third embodiments of the present invention, an individual toolbar is separately provided to each window. However, in the fourth embodiment of the present invention, a universal toolbar is displayed. FIGS. 8-10 illustrate these features. FIG. 1 will also be referred to in this description.

As shown in FIG. 8, the control unit 60 displays at least two Internet browser windows on the screen of the display unit 30 (S81). For example, FIGS. 9 and 10 illustrate the three windows 100A, 100B and 100C being activated and displayed and the window 100D being displayed as minimized. FIGS. 9 and 10 also illustrate the control unit 60 displaying a universal toolbar 200 on the screen of the display unit 30.

As shown, the universal toolbar 200 is provided to collectively control all of the windows. Further, FIGS. 9 and 10 illustrate a bar type tool bar being displayed at the top portions of the multiple windows, but any type of toolbar that is capable of collectively controlling all of the multiple windows can also be used.

Then, as shown in FIG. 8, the control unit 60 determines the user has input a particular command via the universal toolbar 200 (S82). Then, the control unit 60 applies the input command to the three windows 100A, 100B and 100C (S83).

For instance, in FIG. 9, the user can input the 'search' command into a keyword input box 210 of the universal toolbar 200. Then, the input 'search' command is collectively applied to the three windows 100A, 100B and 100C. The search results of each window are then displayed in the corresponding windows.

Note that FIG. 10 is similar to FIG. 9, except that FIG. 10 illustrates each window including a selection box 130A, 130B, 130C and 130D enabling the user to select specific windows to be controlled via the universal toolbar 200. This is similar to the features shown in FIGS. 5 and 7, and thus a detailed description thereof is omitted.

Fifth Embodiment

Figure 11:
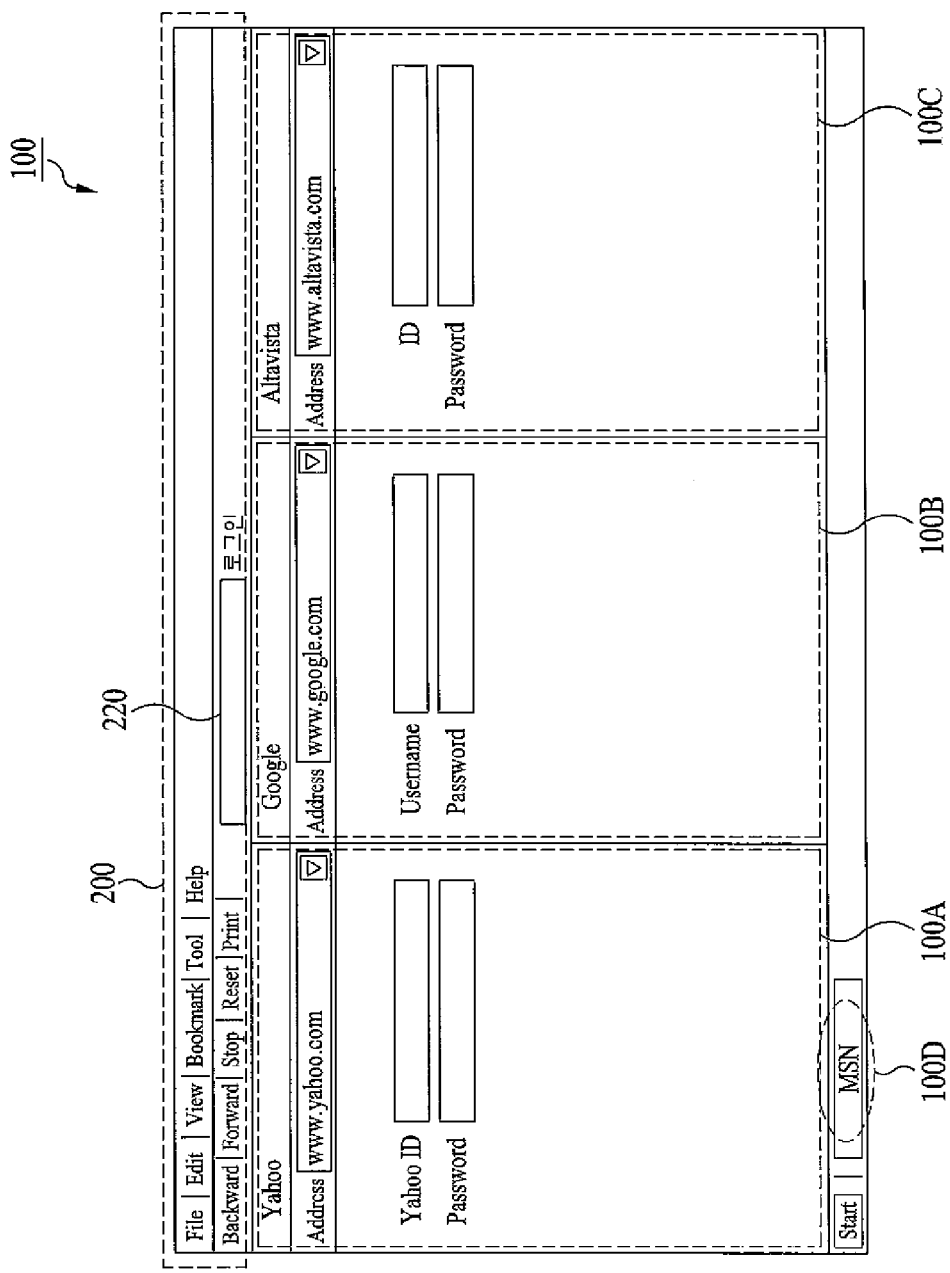
FIGS. 11 and 12 are overviews of a screen of a terminal display unit used to implement a window controlling method according to a fifth embodiment of the present invention.
Figure 12:
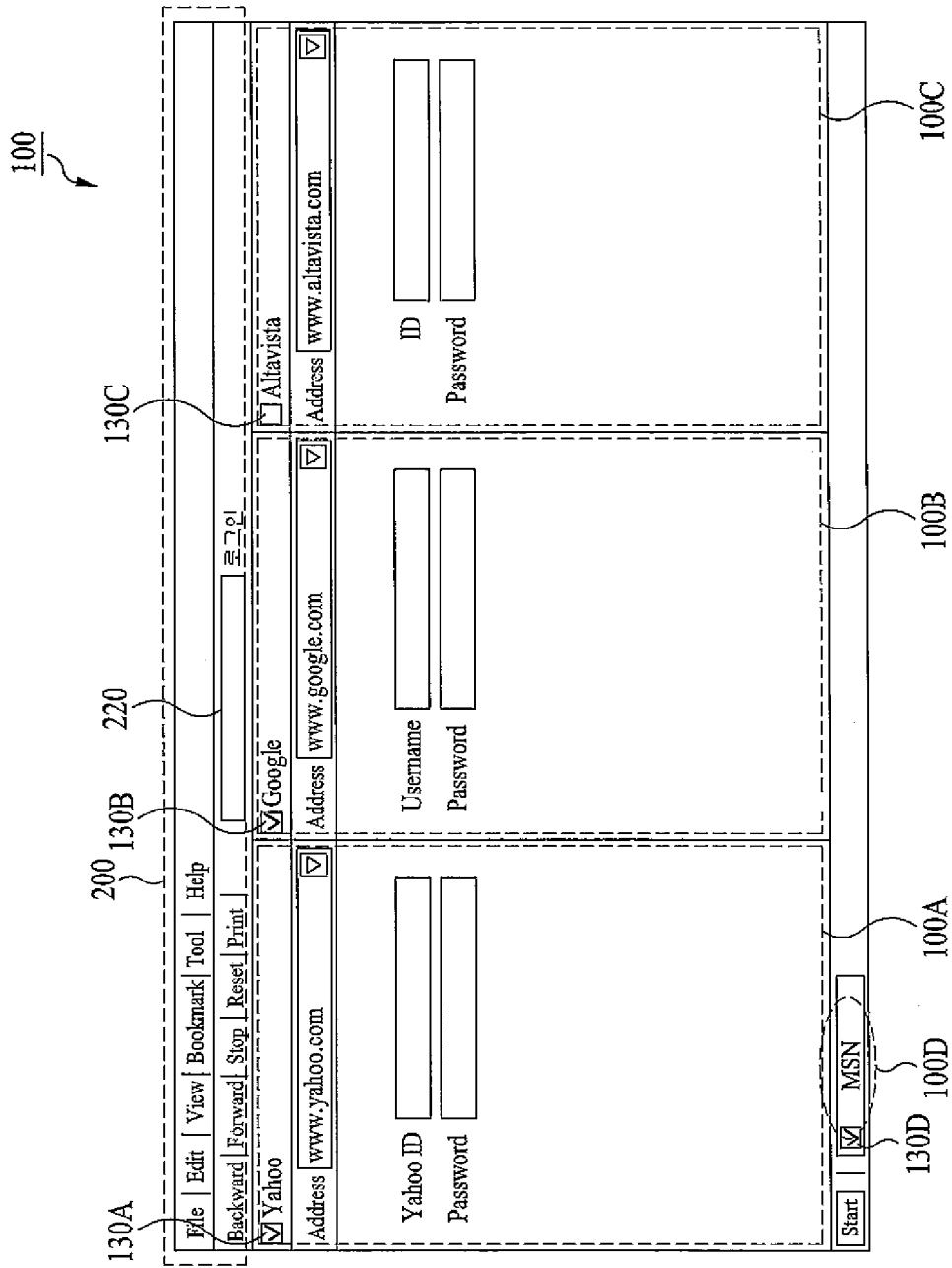

The fifth embodiment describes in more detail the 'log-in' command input method being applied to the universal toolbar. FIGS. 11 and 12 include features related to this embodiment. FIG. 1 will also be referred to in this description.

In this embodiment, an ID and password of a terminal user for each Internet site are stored in the memory unit 40 of the terminal 1 as shown in the example Table 2 below.

TABLE 2

| | | Representative Password freewill |
| --- | --- | --- |
| Internet Site | ID | Password |
| yahoo | chulsoo | ch1234 |
| google | chulsoo1 | ch12345 |
| altavista | kimchulsoo | kim1234 |
| MSN | kimchulsoo | kim1234 |

Further, the IDs and passwords for the respective Internet sites can be equal to or different from each other. As shown in FIG. 11, the control unit 60 controls the display unit 30 to display at least two Internet browser windows. In particular, FIG. 11 illustrates three windows 100A, 100B and 100C being activated and displayed and the window 100D being displayed as a minimized window.

Further, the universal toolbar 200 is also displayed on the screen of the display unit 30. As shown in FIGS. 11 and 12, the universal toolbar 200 also includes the input box 220 that the user can use to input the 'log-in' command.

For example, the user may input a representative password previously set in the terminal. Then, the control unit 60 determines whether the representative password is correct with reference to the information shown in table 2 that is stored in the memory unit 40. If the input password is correct, the control unit 60 applies the correct corresponding ID and password to the three windows 100A, 100B and 100C (and window 100D).

Thus, if the user enters the password "freewill" in the input box 220, the appropriate ID and password for each particular website would be read from table 2 and input into each corresponding window.

Thus, when the user inputs the correct representative password into the input box 220, the correct ID and password can be automatically input to all of the windows. Hence, the user's convenience and facilitation is enhanced. FIG. 12 is similar to FIG. 11, except the windows include the selection boxes 130A, 130B, 130C and 130D. This is similar to the selection boxes shown in the other embodiments, and thus a detailed description thereof is omitted.

Sixth Embodiment

In the fourth and fifth embodiments of the present invention, the universal toolbar is displayed as a default. Thus, it is possible to control all of the windows using the single universal toolbar. In the sixth embodiment of the present invention, the user can selectively activate a universal toolbar, if needed, and then control the windows via the activated universal toolbar. This embodiment will now be explained with reference to FIGS. 13 to 15. FIG. 1 will also be referred to in this description.

Figure 13:
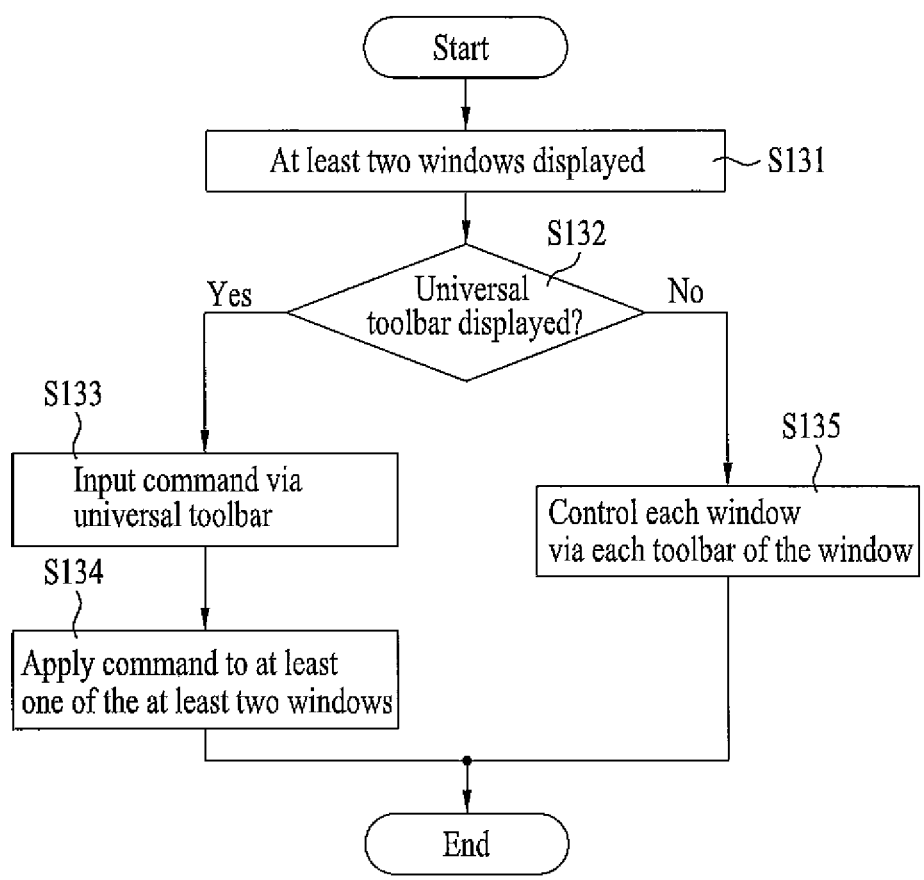
FIG. 13 is a flowchart of a method of controlling windows according to a sixth embodiment of the present invention.
Figure 14:
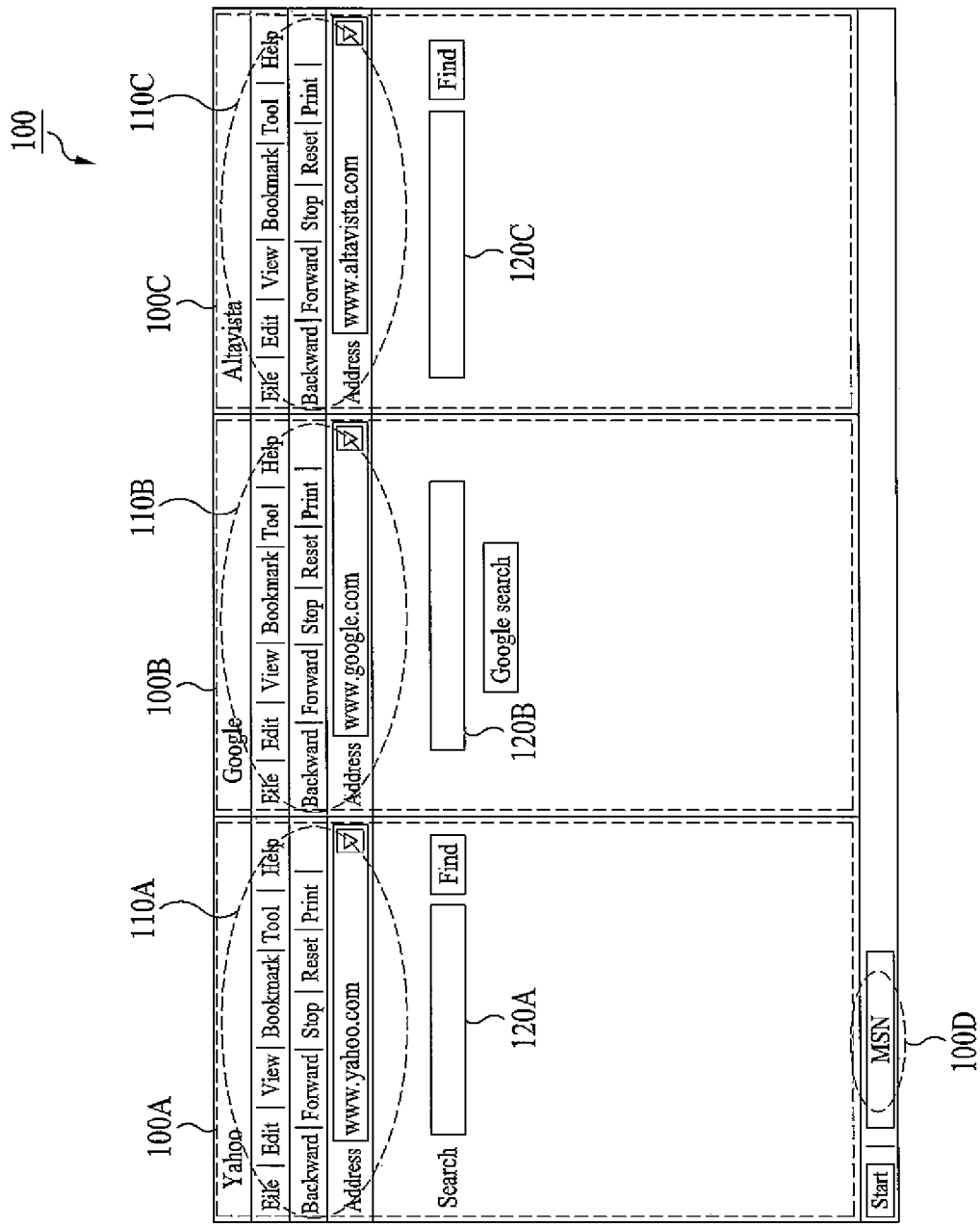
FIGS. 14 and 15 are overviews of a screen of a terminal display unit used to implement the window controlling method according to the sixth embodiment of the present invention.

In more detail, as shown in the flowchart of FIG. 13, the control unit 60 controls the display unit 40 to display at least two windows (S131). Similar to the other embodiments and as shown in FIGS. 14 and 15, the control unit 60 controls the display unit 40 to display the three windows 100A, 100B and 100C as being activated and displayed and the other window 101D as being displayed as a minimized window.

Thus, with reference to FIG. 13, the control unit 60 determines if the user has requested a universal tool bar be displayed (S132). If the user requests the universal toolbar the displayed (Yes in S312), the control unit 60 controls the display unit 40 to display a universal tool bar. For example, FIG. 15 illustrates a universal toolbar 200 being displayed. Then, when the user enters a command into the universal toolbar 200 (S133), the control unit 160 applies the command to all of the windows 110A, 110B, 100C and 100D (or the windows that the user has designated as multi-cooperation windows) (S134). Otherwise (No in S132), control unit 60 controls each window separately (S135). FIG. 14 illustrates each window including its own toolbar.

Figure 15:
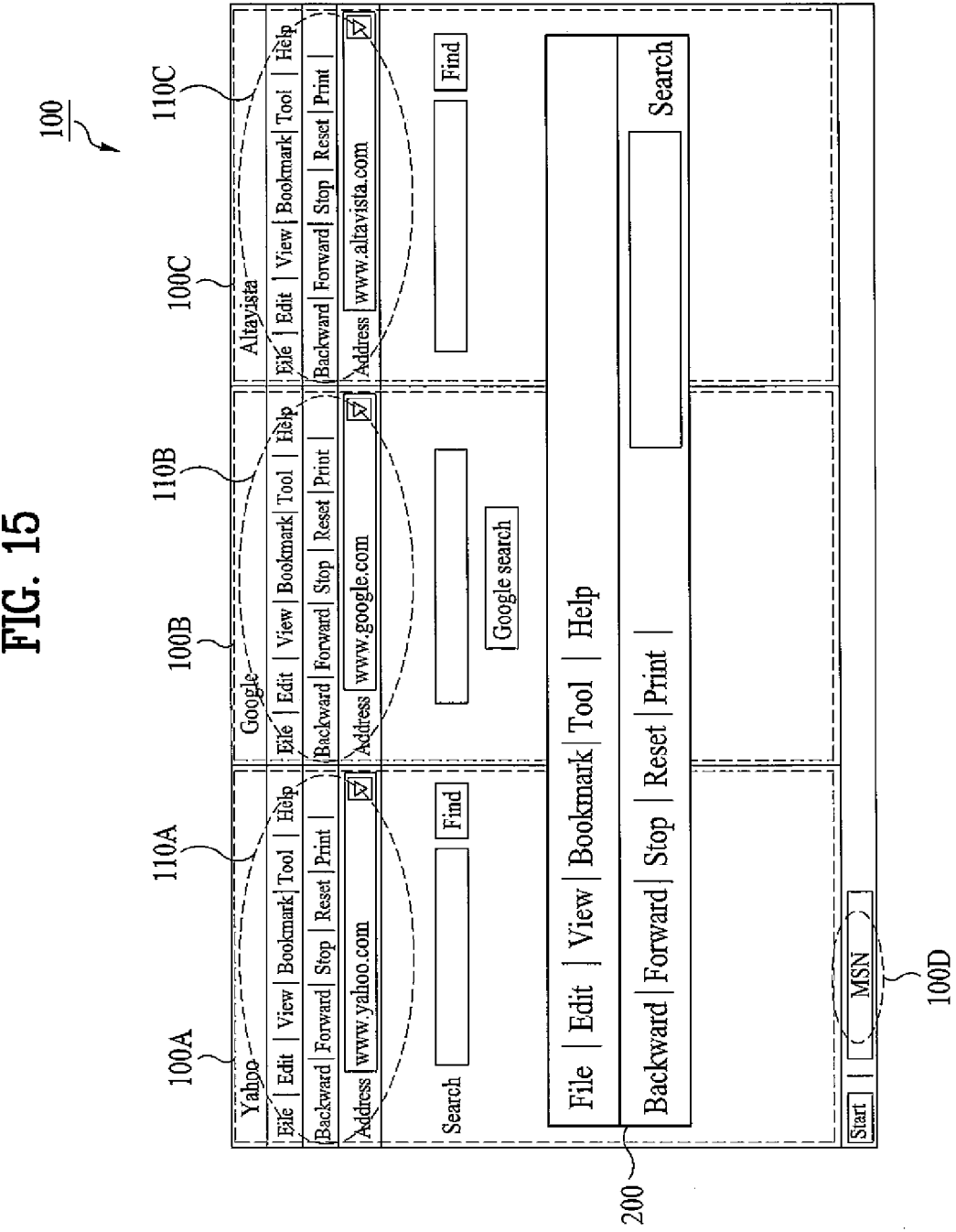

Therefore, in this embodiment, when the user wants to control the windows simultaneously, the user can enter a specific command via the input unit 50 so the control unit 60 displays the universal toolbar 200 shown in FIG. 15. Further, the displayed universal toolbar 200 is preferably displayed as an OSD (on screen display) feature on the display unit 30.

In addition, the user may request the universal toolbar 200 be displayed by pressing or manipulating a separate function key (not shown in the drawings) provided with the input unit 50. Also, if the display unit 30 includes a touch screen, the touch screen may include a soft key that the user can touch to have the universal toolbar 200 be displayed.

Seventh Embodiment

FIGS. 16-19 illustrate features of the seventh embodiment. FIG. 1 will also be referred to in this description. In the seventh embodiment, the user can select any displayed window (or multiple displayed windows) and have the selected displayed windows displayed being equal in size.

Figure 16:
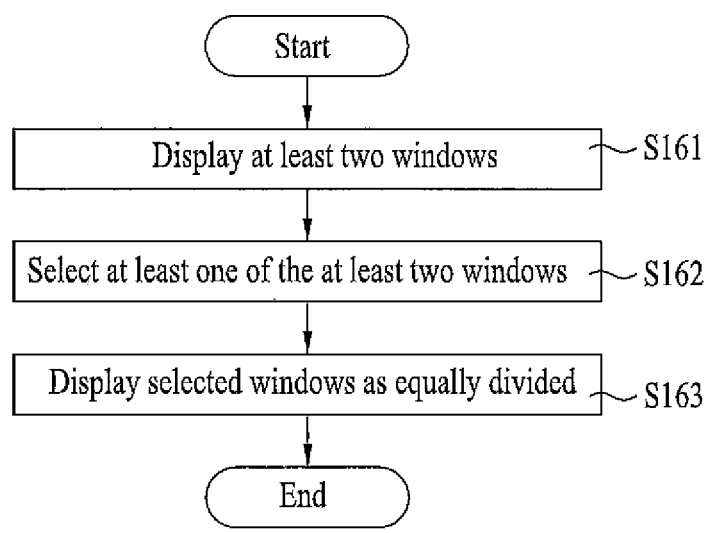
FIG. 16 is a flowchart of a method of controlling windows according to a seventh embodiment of the present invention.

In more detail, and as shown in FIG. 16, the control unit 60 controls the display unit 30 to display at least two windows (S161). This step is similar to embodiments discussed above. Then, the user selects one or more of the windows that he or she wants to be equally displayed (S162). The control unit 60 then displays the selected windows as being equal in size (S163).

Figure 17:
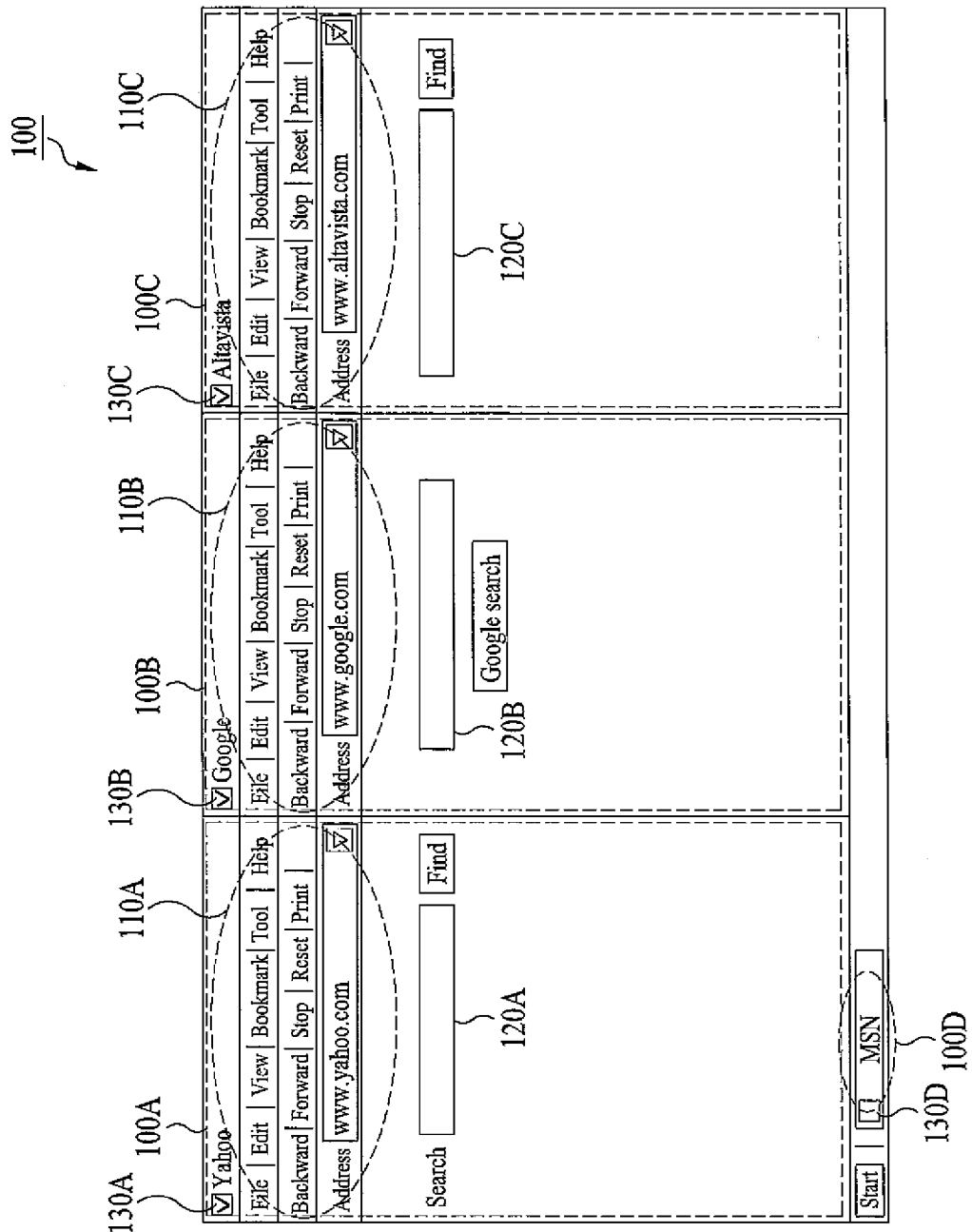
FIGS. 17 to 19 are overviews of a screen of a terminal display unit used to implement the window controlling method according to the seventh embodiment of the present invention.

For example, FIG. 17 illustrates the three windows 100A, 100B and 100C being activated and displayed and the window 100D being displayed as a minimized window. Also, as mentioned above in some of the other embodiments, the four windows 100A, 100B, 100C and 100D respectively include the selection boxes 130A, 130B, 130C and 130D enabling the user to select specific windows that he or she wants to interoperate with each other.

Therefore, as shown in FIG. 17, the user has selected the three windows 100A, 100B and 100C. Thus, in this instance, the control unit 60 controls the display unit 30 to display the windows 100A, 100B and 100C as being equal in size, and the unselected window 100D as being displayed as a minimized window.

Figure 18:
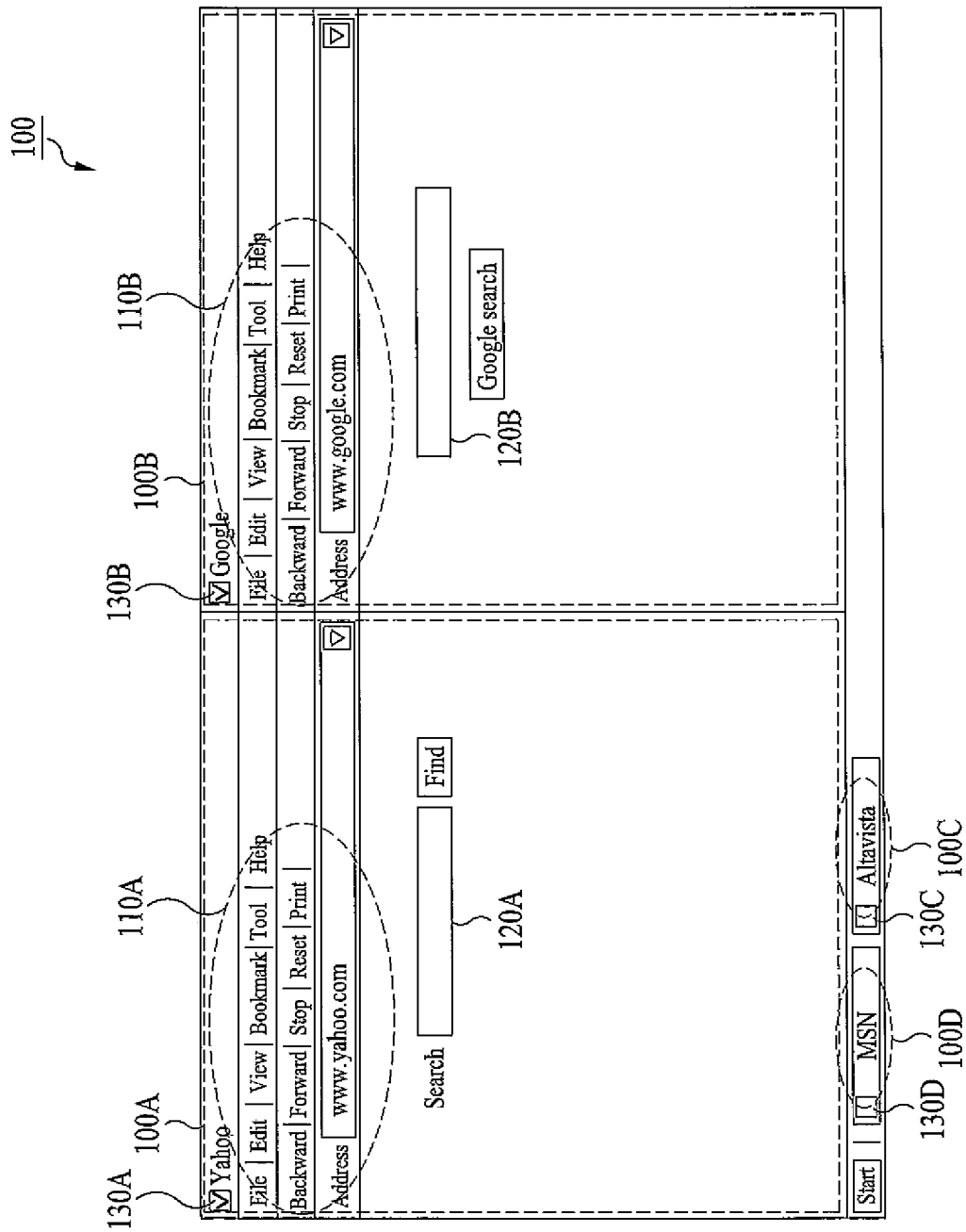
Figure 19:
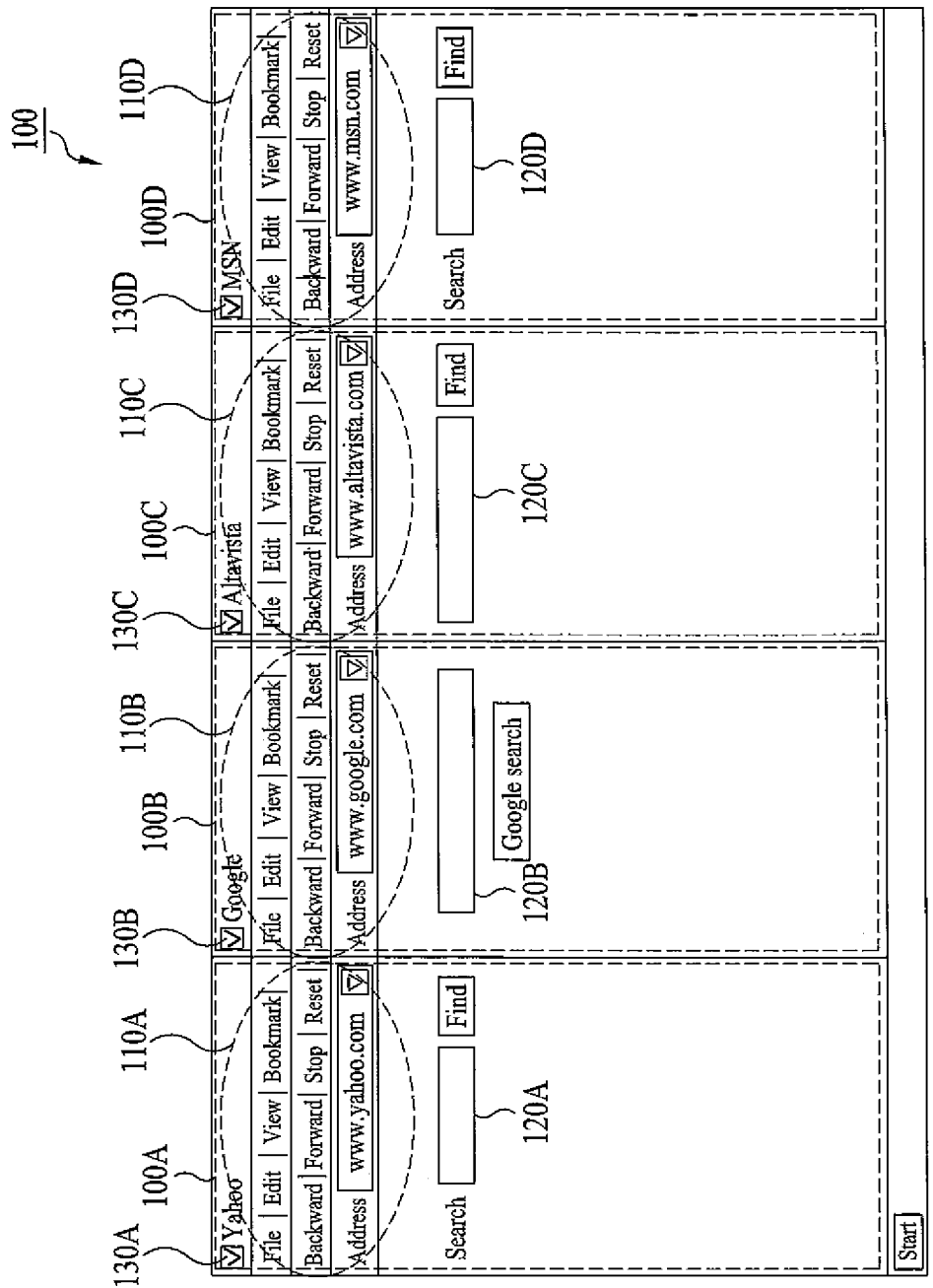

Likewise, FIG. 18 illustrates the user only selecting the windows 100A and 100B. Thus, the control unit 60 controls the display unit 30 to display the windows 100A and 100B as being equal in size, and the other two windows 100C and 100D as being minimized. FIG. 19 illustrates all windows 100A-100D being selected, and therefore being displayed as equal in size.

Therefore, according to this embodiment, the windows that are selected via the selection boxes are displayed equal in size, whereas the windows that are not selected are minimized.

Further, when the display unit 30 includes a touch screen, the user can simply touch the selection boxes to designate a particular window to interoperate with other selected windows. The user can also simply touch a soft key in the toolbar to have that command input to all selected windows. The user can also perform any other input operations on the terminal by touching the appropriate portions of the touch screen.

Accordingly, the present invention provides several advantages.

First of all, the user can apply one command to a plurality of displayed windows. Thus, the user does not have to input the command to each window. Secondly, the appropriate login information (e.g., ID and password) are stored in the memory, and the user can enter login information into one window, and have the appropriate login information automatically entered into other windows.

Thirdly, the user can easily select windows that he or she wants displayed equally in the screen, without having to manually resize each window.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling windows in a terminal, the method comprising:
   displaying at least first and second windows, each of the first and second windows having a selection box;
   displaying a universal toolbar for operating the first and second windows;
   inputting a command via the universal toolbar;
   selecting the selection box for at least one of the first and second windows; and
   executing the input command with respect to only windows of the first and second windows that have the selection box selected,
   wherein when one of the first and second windows is minimized, only a title bar of the minimized window is displayed such that the selection box corresponding to the minimized window is displayed together with a title of the minimized window on the title bar of the minimized window and the selection box is visible and can be selected even when said one of the first and second windows is minimized, and
   wherein the input command includes at least one of a reset or reload command, a log-in command, a search command and a print command.

2. The method of claim 1, wherein displaying the universal toolbar is performed when a specific command is input to the terminal.

3. The method of claim 1, wherein the universal toolbar is displayed as an OSD (on screen display) toolbar.

4. The method of claim 1, wherein the first and second windows include Internet browser windows.

5. The method of claim 1, wherein the input command includes at least one of a reset or reload command, a log-in command, a search command and a print command.

6. The method of claim 5, wherein the print command prints information displayed on both of the first and second windows.

7. The method of claim 5, wherein the print command prints information displayed on both of the first and second windows on a single page or prints both the information displayed on the first and second windows on separate pages.

8. The method of claim 1, wherein the universal toolbar includes a log-in information input box and the input command is a log-in command, and
   wherein the log-in command is input to the log-in information input box and a corresponding log-in command is input to the first and second windows.

9. A terminal, comprising:
   a display unit configured to display at least first and second windows, and to display a universal toolbar for operating the first and second windows, each of the first and second windows having a selection box;
   an input unit configured to input a command via the universal toolbar and allow selection of the selection box for the first and second windows; and
   a control unit configured to execute the input command with respect to only windows of the first and second windows that have the selection box selected,
   wherein, when one of the first and second windows is minimized, the control unit is further configured to display only a title bar of the minimized window such that the selectable selection box corresponding to the minimized window is displayed together with a title of the minimized window on the title bar and the selection box is visible and can be selected even when said one of the first and second windows is minimized, and
   wherein the input command includes at least one of a reset or reload command, a log-in command, a search command and a print command.

10. The terminal of claim 9, wherein the display unit includes a touch screen and the input unit comprises soft keys displayed on the touch screen that a user touches to input the command.

11. The terminal of claim 9, wherein displaying the universal toolbar is performed when a specific command is input to the tei in inal.

12. The terminal of claim 9, wherein the universal toolbar is displayed as an OSD (on screen display) toolbar.

13. The terminal of claim 9, wherein the first and second windows include Internet browser windows.

14. The terminal of claim 1, wherein the print command prints information displayed on both of the first and second windows.

15. The terminal of claim 1, wherein the print command prints information displayed on both of the first and second windows on a single page or prints both the information displayed on the first and second windows on separate pages.

16. The terminal of claim 9, wherein the universal toolbar includes a log-in information input box and the input command is a log-in command, and
   wherein the log-in command is input to the log-in information input box and a corresponding log-in command is input to the first and second windows.

* * * * *